United States Patent [19]

Garwin

[11] 4,429,948
[45] Feb. 7, 1984

[54] OPTICAL ALIGNMENT COMPENSATION

[75] Inventor: Richard L. Garwin, Scarsdale, N.Y.

[73] Assignee: International Business Machines Corporation, Armonk, N.Y.

[21] Appl. No.: 263,648

[22] Filed: May 14, 1981

[51] Int. Cl.³ ............................................. G02B 27/17
[52] U.S. Cl. ...................................................... 350/6.8
[58] Field of Search ......................................... 350/6.8

[56] References Cited

U.S. PATENT DOCUMENTS

| | | | |
|---|---|---|---|
| 3,212,100 | 10/1965 | Buck | 324/97 |
| 3,360,659 | 12/1967 | Young | 250/236 |
| 3,488,102 | 1/1970 | Buck et al. | 350/7 |
| 3,709,602 | 1/1973 | Satomi | 355/49 |
| 3,845,298 | 10/1974 | Runciman | 250/236 |
| 3,866,038 | 2/1975 | Korth | 250/236 |
| 3,897,132 | 7/1975 | Meeussen et al. | 350/6.7 |
| 3,956,586 | 5/1976 | Ullstig | 178/7.6 |
| 3,972,583 | 8/1976 | Lobb | 350/6.8 |
| 4,030,806 | 6/1977 | Goshima et al. | 350/7 |
| 4,054,360 | 10/1977 | Oosaka et al. | |
| 4,304,459 | 12/1981 | Kramer | 350/6.7 |

FOREIGN PATENT DOCUMENTS

| | | | |
|---|---|---|---|
| 2394105 | 5/1979 | France . | |
| 54-119259 | 9/1979 | Japan | 350/6.8 |
| 2000321 | 1/1979 | United Kingdom . | |

*Primary Examiner*—John K. Corbin
*Assistant Examiner*—Rebecca D. Gass
*Attorney, Agent, or Firm*—Alvin J. Riddles

[57] ABSTRACT

In apparatus such as optical scanners and printers wherein a beam of light is reflected along a moving mirror surface to another location, the accuracy of tilt of the moving mirror and the travel of scan can be controlled by reflecting the beam of light from the moving mirror to first and then second intersecting mirror surfaces and then back to the moving mirror.

5 Claims, 9 Drawing Figures

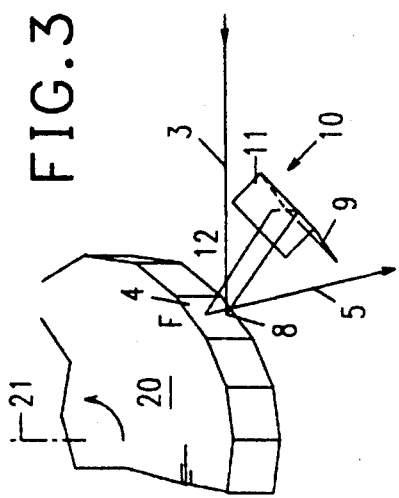
FIG.3
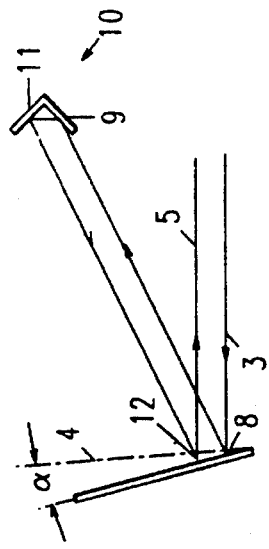
FIG.5 SIDE VIEW
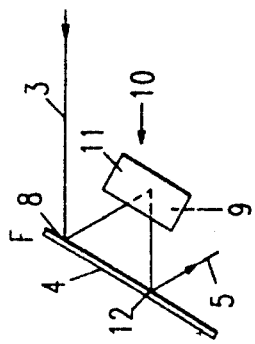
FIG.4 TOP VIEW

OPTICAL ALIGNMENT COMPENSATION

DESCRIPTION

1. Technical Field

The technical field of the invention is that of optical apparatus wherein a beam of light containing information is reflected from a moving mirror in scanning.

2. Background Art

There are two types of apparatus that employ this principle. In one type, an image is modulated in a light beam. The moving mirror provides one axis of a two-dimensional area scan. The reflected light from the mirror strikes a second surface with movement in a direction orthogonal to the movement of the mirror providing the second axis of the two-dimensional area scan. An image assembled on an area of the second surface then can be either displayed or printed.

In the second type of apparatus, light that is reflected from an object as it is scanned is returned to the moving mirror which directs a beam containing the scanned details of the surface of the object to what is generally a small area such as a phototube or photoconversion integrated circuit chip.

In each of these types of apparatus, the movement of the mirror directs a beam of light to a photoresponsive area and variations in tilt of the moving mirror orthogonal to the direction of motion are undesirable.

The more frequently used apparatus employing this technique involves a structure wherein the moving mirror is a number of small mirror facets on the periphery of a disk, where each facet provides a sweep of a light beam on a photoresponsive second surface as the disk is rotated. In such apparatus, for example, if the light beam that passes across an individual mirror facet is to form a line of print on the second surface, it will be apparent that a very small variation in the tilt of the facets on the periphery of the disk with respect to each other will result in the lines of print on the second surface not being parallel and overlapping.

DESCRIPTION OF THE DRAWINGS

FIG. 3 is an embodiment of the invention wherein the moving mirror apparatus is a plurality of mirror facets on the periphery of a disk.

FIG. 4 is a top view of FIG. 3.

FIG. 5 is a side view of FIG. 3.

DISCLOSURE OF INVENTION

In accordance with the invention, when the light beam being reflected from a moving mirror is reflected from each facet of a pair of mirrors, the planes of which intersect at a line, and then the beam is reflected back to the moving mirror, the effect of any variation in tilt of the moving mirror orthogonal to the direction of the motion of the mirror will be compensated. In a preferred embodiment, the mirrors are two plane mirrors that are joined at an angle to each other along a line. This structure may be referred to as a dihedral mirror assembly.

A second feature of the invention is that the line of intersection of the planes of the two intersecting mirrors or, in other words, the spine of the dihedral mirror assembly when rotated with respect to the direction of movement of the moving mirror operates to narrow the travel of the light beam that is reflected to the photoresponsive area. With this capability, two advantages are gained. The distance traversed on the photoresponsive surface is adjustable permitting enlargement and reduction, and where the moving mirror apparatus is made up of facets on the periphery of a disk, the number of facets required becomes adjustable.

An additional advantage is gained in that a line image of the beam is not formed on the mirror facets so that the arrangement is intrinsically capable of handling very high pulse laser power.

Figure 1:
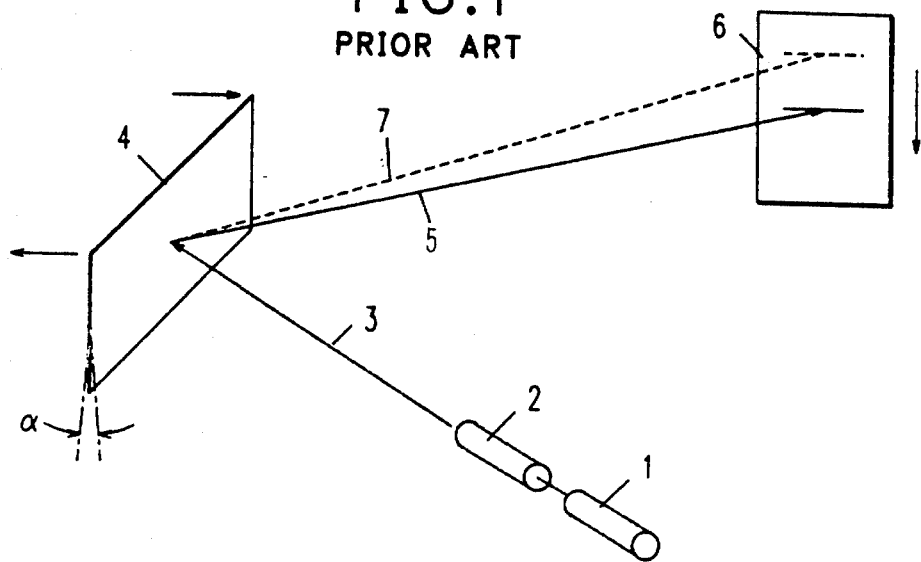
FIG. 1 is a schematic illustration of the prior art showing the effect of tilt of the moving mirror.

Referring to FIG. 1, there is shown a prior art schematic illustration of one type of apparatus, that of a light beam printing or display device to which the invention may be applied for improvement.

In this illustration, there is a light source 1 which is typically a laser which provides a light beam through a modulator 2 into which an optical image is introduced for modulation into the light beam which emerges labelled element 3. The modulated light beam 3 strikes the mirror 4. When the mirror 4 is moved such as by rotation or oscillation so that the ends move in the direction shown by the arrows, the light beam 3 is reflected in a beam 5 which would transverse a line on a second photoresponsive surface labelled element 6. The photoresponsive surface 6 can be provided with motion as shown by the arrow that is perpendicular to the mirror 4 movement. The mirror 4 movement and the photoresponsive area 6 movement in combination define the x-y axes of an area scan.

In such a structure, it will be apparent that the tilt angle $\alpha$ of the moving mirror 4 must remain constant during the travel or the light beam 5 will not follow a straight line on element 6. The effect of a change in the angle $\alpha$ is illustrated by the dotted line 7.

In the various structures, control of the tilt of the angle $\alpha$ is a critical and an expensive aspect of the structure. Where the motion of the moving mirror is vibrating or oscillating, the motion must be around one axis so that the moving mirror will remain in one plane throughout the travel or the place on the photoresponsive surface where the reflected beams strike will not be precise.

The most popular structure for this type of apparatus consists of a disk with the mirror 4 being a plurality of facets mounted around the periphery. This type of structure requires great care to insure that all moving mirror facets have the same identical $\alpha$ with respect to each other or the light beam will not strike a predictable location on the surface 6.

Figure 2:
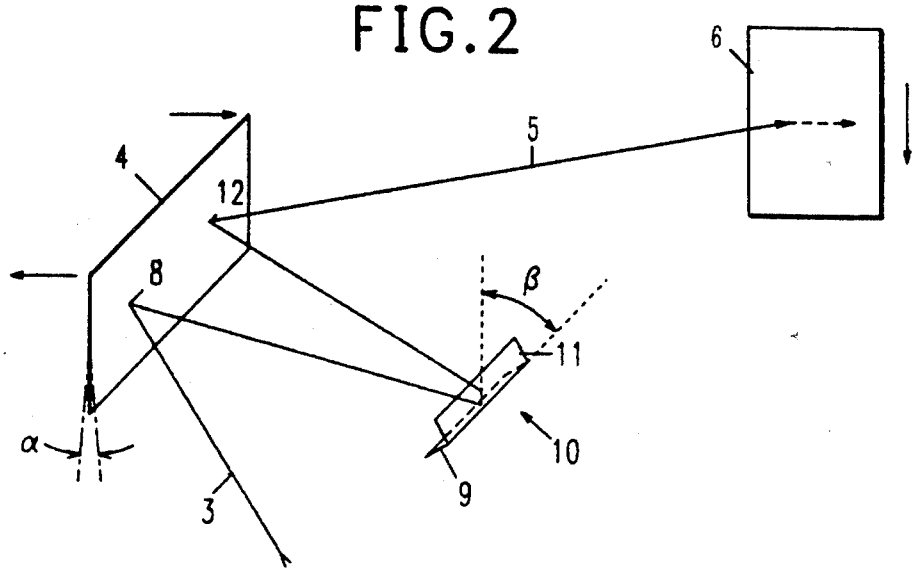
FIG. 2 is a schematic illustration showing the optical compensation of the invention.

Referring to FIG. 2, a schematic illustration of the invention is provided wherein elements 1 and 2 of FIG. 1 are no longer shown. The information containing beam 3 is reflected from the moving mirror 4 at a first point 8 to a first facet 9 of a dihedral mirror assembly having a spine 10 and then from a second facet 11 of the dihedral mirror assembly back to a point 12 on the moving mirror 4. The result in accordance with the invention is that even with variations in the angle $\alpha$, the trace of the beam 5 across the area 6 will remain a series of straight parallel lines as the area 6 advances incrementally in the direction of the arrow for each period of motion of the moving mirror 4 or the passage of each facet where the moving mirror is a plurality of facets on the periphery of a disk.

A second advantage in accordance with the invention, referring to FIG. 2, is achieved by the rotation of the spine or line of intersection 10 of the dihedral mirror assembly through the angle $\beta$ which operates to change the sweep of the beam 5 and to change the travel on the member 6. The travel of the beam 5 on the surface 6 is greatest when the line of intersection 10 is horizontal or parallel to the direction of motion of the moving mirror. The scan of beam 5 is essentially shut off when the line of intersection 10 is perpendicular and adjustable for values of $\beta$ in between. Where the apparatus is of the scanning type, where light reflected from an object comes in as beam 3 and is reflected out beam 5 to a small photosensitive member, such as a phototube or photosensitive integrated circuit, the ability in accordance with the invention to limit variations in $\alpha$ so as to get all the light to the small photosensitive member and through adjustment of $\beta$ to control the beam travel on the photosensitive member provides a substantial improvement.

BEST MODE OF CARRYING OUT THE INVENTION

In accordance with the invention, the optical compensation involves simply a retroreflection of the light beam from the movable mirror to a first and then a second facet of a dihedral mirror and then back to the movable mirror and thence to the region where the beam will be utilized.

Referring to FIGS. 3, 4 and 5, which respectively are a perspective view, a top view and a side view of the optical compensation in accordance with the invention wherein the moving mirror apparatus is a series of individual facets of a polygonal faceted disk.

In FIG. 3, the moving mirror is one of a plurality of facets 4 on the periphery of a disk 20 equipped for rotation around an axis 21. When light beam 3 strikes the facet at point 8, it is reflected to the facet 9 of a dihedral mirror assembly which is joined at a spine or line 10 then to facet 11 and thereafter back to the moving mirror 4 at point 12 from which it emerges as light beam 5.

Referring to FIG. 4, which is the top view, illustrates the position of the spine 10 with respect to the movement of mirror 4. The beam 3 strikes the moving mirror 4 at point 8 where it is reflected to the dihedral mirror assembly having the spine 10 parallel to the direction of rotation. The reflected light from beam 3 strikes the lower of the two members of the dihedral mirror 9, is then reflected to the upper member 11 and then back to the moving mirror 4 at point 12 where it is reflected as beam 5.

Referring next to the side view in FIG. 5, the effect on tilt variation $\alpha$ of the moving mirror 4 is illustrated. As in FIGS. 3 and 4, the light beam 3 strikes the moving mirror 4 at point 8, is reflected off dihedral mirror facet 9 to dihedral mirror facet 11 and thence back to the moving mirror 4 at point 12 where it emerges as beam 5. The spine 10 of the dihedral mirror assembly is parallel to the direction of motion. In this view, the angle $\alpha$ representing the tilt of the facet is more clearly visible and the ability of the optical compensation of the invention to accommodate variations in tilt or angle $\alpha$ is illustrated. As $\alpha$ varies, the angles of reflection from the two facets of the dihedral mirror change in opposite directions and the beam 5 remains parallel to the beam 3.

In more detail, referring to FIGS. 3, 4 and 5, the axis of rotation 21 is vertical and the plane of the disk 20 and of the beam 3 is horizontal, and the dihedral mirror assembly will be placed with the spine 10 parallel to the plane of the disk 20. The beam 3 will strike the moving mirror 4, be reflected to the lower facet 9 of the dihedral mirror assembly, thence to the upper facet 11 and back to the moving mirror 4 again.

Under these circumstances, if the direction perpendicular to the face of the moving mirror 4 makes an angle Ah with respect to the incident beam in the mirror scanning plane, the first reflection from the mirror will be deviated by 2Ah and the beam in accordance with the invention that has been twice reflected from the facet will be deviated by an angle 4Ah in the horizontal plane. Thus for a given angular beam travel, the moving mirror 4 apparatus with the optical compensation of this invention will, when made of a plurality of facets on the periphery of a disk 20, have twice as many facets. Hence, the disk can be constructed to have twice the diameter and move at half the rotational speed.

In the vertical plane, the dihedral mirror assembly takes a beam which enters at an up-angle Av to the horizontal and turns it back parallel to itself. This is most clearly illustrated in connection with FIG. 5 and beam 5 emerges from its second reflection from the moving mirror 4 at point 12 precisely in the horizontal plane independent of the facet tilt $\alpha$.

If the angle of intersection of the planes of the facets 9 and 11 of the dihedral mirror is not 90° at the spine 10, the retroreflection beam back to the moving mirror is deviated by twice the angle Av by which the included angle between the facets 9 and 11 of the dihedral mirror assembly differs from 90°.

Nevertheless, the angle $\alpha$ of the facet tilt will be precisely corrected for any position of the dihedral mirror assembly so long as the spine 10 is in a horizontal plane essentially parallel to the direction of motion of the moving mirror facet.

The advantages of the invention may be appreciated by contrasting with the prior art optical correction approaches previously employed. These approaches involved double cylindrical lenses with high costs and having typical lens aberrations. In such prior art structures, there is a single reflection from a moving mirror and a subsequent passage through four surfaces of a correcting lens was employed. In contrast, when the invention is employed, there are only four reflections from mirror surfaces involved and the dihedral mirror assembly is of negligible cost compared to a cylindrical lens.

It is frequently desirable in applications such as multiple resolution displays and small area sensors to have instances when the output beam will travel different lengths. In some display and printing apparatus this can be achieved by adding to the number of facets on the disk 20.

In accordance with the invention, a control of the distance traversed on the area 6 by the beam 5 in FIG. 2 is accomplished by variation of the angle $\beta$. This is shown in more detail in connection with FIG. 6.

Figure 6:
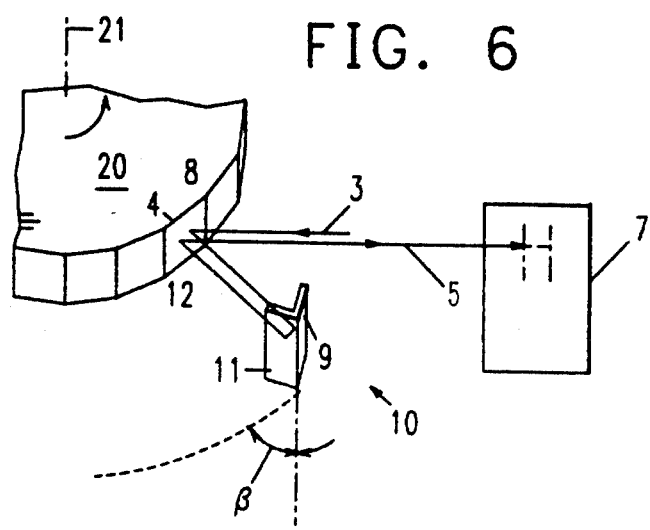
FIG. 6 is an illustration of the capability of the invention to narrow the scan area by adjusting the travel on the second surface.

Referring next to FIG. 6, by turning the spine 10 of the dihedral mirror assembly from the position shown in FIG. 2 parallel to the direction of motion of the moving mirror 4 to a position approaching perpendicular to the direction of motion, the result will be that the output beam 5 will move closer to the input beam 3.

Through the rotation of the angle $\beta$ it is possible to provide a shutter action and that will effectively shut off the scan of beam 5.

The size of the angle $\beta$ through which the spine 10 departs from horizontal will determine the travel of beam 5 and the length of the scan on the area 7. This is illustrated in connection with FIG. 7.

Figure 7:
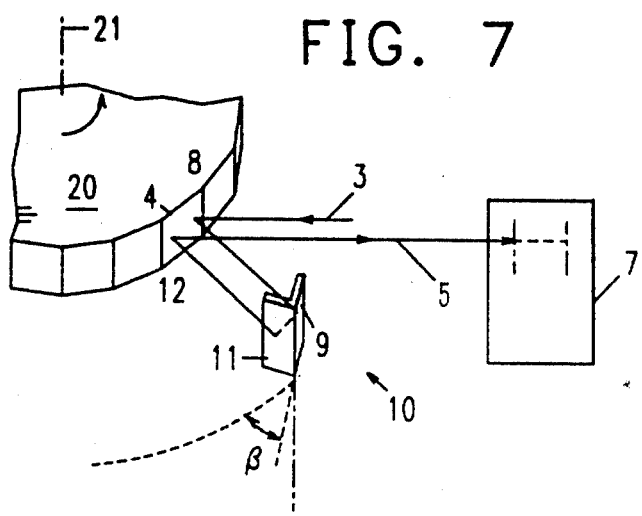
FIGS. 7, 8 and 9 illustrate optical paths in both narrowing the scan and providing optical compensation.

Referring next to FIG. 7, the spine of the dihedral mirror is twisted through the angle $\beta$ to a position that is something less than 90° so that the spine 10 is canted. Since for the horizontal position as shown in FIG. 3 there is maximum scan and for the vertical position in FIG. 6 there is minimum scan, effectively shutting off the scan of the beam 5, then in FIG. 7 by changing the angle $\beta$ between horizontal and vertical, a selection can be made of the desired scan width. The scanning range will be twice the square of the sine of the angle $\beta$ of the spine 10 from the vertical.

Thus, in accordance with the invention, where a display or printer application is involved, the selectable angle $\beta$ permits selection of the width of the display or print area. Similarly, where the application is the scanning of an object and the transfer of the beam containing the scanned information to a small photosensitive receiver, the selectable angle $\beta$ permits positioning the width of the beam travel within the photosensitive reception region.

Figure 8:
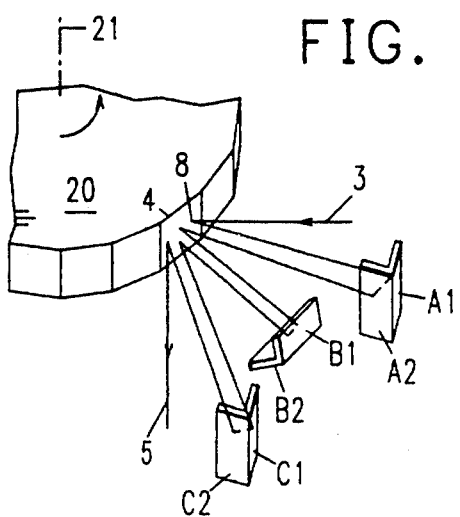

Scan reduction by means of a dihedral mirror gives up facet tilt compensation of the angle $\alpha$. The advantages of both features, that of compensating angle $\alpha$ variation and selecting scan width through angle $\beta$ variation may be realized in the same structure by employing two scan reducing dihedral mirror assemblies together with a facet tilt compensating dihedral mirror assembly. This arrangement is illustrated in FIG. 8 wherein the moving mirror facet is F, the scan reducing mirror assemblies are labelled A and C and the facet tilt mirror assembly is labelled B. The optical path would then be 3-F-A-F-B-F-C-6.

If the spines of mirror assemblies A and C are tilted at precisely the same angle $\beta$ so that each one by itself would give a 5° scan, the combination of the two would give a 10° scan angle while mirror B will compensate precisely any tilt of facet F. Where mirror assembly B changes the up-angle introduced by mirror assembly A into a precisely equal down-angle, this is restored very largely to the horizontal plane by the identically positioned mirror assembly C. The compensation is almost precise when the angle $\beta$ of the spine of mirror assembly C is precisely the same as that of the spine of mirror assembly A.

Figure 9:
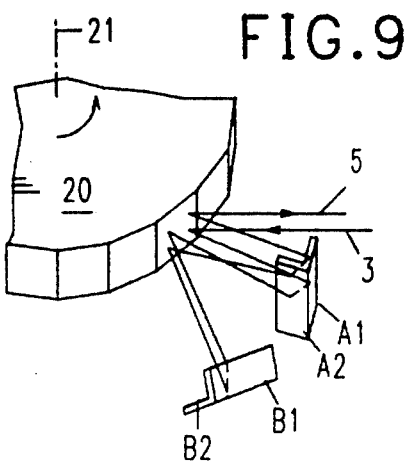

Referring next to FIG. 9, a simplification is accomplished by combining the two scan reducing mirror assemblies A and C by reflecting from different parts of the same facets of the same mirror assembly. To do this, mirror assembly B, the facet F tilt compensating mirror assembly, is arranged to send the ray reflected from the facet F again to mirror assembly A at a different spot, thus eliminating mirror assembly C of FIG. 8. In this the path is 3-F-A1-A2-F-B1-B2-F-A2-A1-F-6.

What has been described is an optical compensation from a moving mirror where the beam is reflected off two facets of a dihedral mirror and back to the same moving mirror and the use of the reflection path to control both scan width and facet tilt. The technique of the invention has low cost achromaticity which permits it to be used in the ultraviolet and infrared without modification.

Having thus described my invention, what I claim as new and desire to secure by Letters Patent is:

1. In apparatus providing a raster scan of a surface by a beam of light, said raster scan being made up of a series of side to side movements of said light beam combined with incremental advancement of said surface in an orthogonal direction to said side to side movements and wherein the said side to side movements of said light beam are produced by reflection in the path between the source of said light and said surface of said light beam along a light path direction on a moving reflecting member, the improvement for selective control of the length of said side to side movements comprising at least one dihedral mirror assembly having reflecting surfaces that intersect in a line, means positioning said assembly with said line perpendicular to the said light path direction of said moving reflecting member, and means positioning one of said intersecting reflecting surfaces of said dihedral mirror at a side to side light beam movement length determining angle with respect to said moving reflecting member.

2. The apparatus of claim 1 including tilt correction for said moving reflecting member comprising dihedral mirror means with reflecting surfaces that intersect at a line, means positioning said tilt correction dihedral mirror intersection line perpendicular to the dihedral mirror intersection line of said side to side movement length selection mirror, and means positioning said tilt correction serially in the path of said light beam between said source, said side to side movement length selection mirror and said surface.

3. The apparatus of claim 1 wherein said light path direction on said moving reflecting member is from side to side of an essentially rectangular reflecting mirror facet mounted on the periphery of a rotating member, and said side to side movement length determining angle is with respect to the peripheral path of said rotating member.

4. The apparatus of claim 3 including tilt correction means for said moving reflecting member comprising at least one dihedral mirror with reflecting surfaces that intersect at a line, means positioning each said at least one tilt correction dihedral mirror line perpendicular to the intersection line of said side to side movement length selection dihedral mirror, and means positioning each said at least one tilt correction dihedral mirror serially in the path of the light between at least one of said source, said side to side movement length selection mirror and said surface.

5. The apparatus of claim 4 wherein said tilt correction means involves first and second tilt correction dihedral mirrors positioned serially in the path of said light beams between said source and said surface before and after said side to side movement length selection dihedral mirror.

* * * * *